(12) United States Patent
Schar

(10) Patent No.: US 6,297,937 B1
(45) Date of Patent: Oct. 2, 2001

(54) SUSPENSION WITH ADJUSTABLE PRELOAD

(75) Inventor: Terry W. Schar, Lakeville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/204,642

(22) Filed: Dec. 2, 1998

Related U.S. Application Data

(60) Provisional application No. 60/075,714, filed on Feb. 24, 1998.

(51) Int. Cl.[7] ............................ G11B 5/56; G11B 21/24; G11B 5/48; G11B 21/16
(52) U.S. Cl. ...................................... 360/294.7; 360/244.2
(58) Field of Search .............................. 360/234, 294.7, 360/244.2, 244.3, FOR 209

(56) References Cited

U.S. PATENT DOCUMENTS

| | | | |
|---|---|---|---|
| 4,658,331 | * | 4/1987 | Berg ..................................... 361/705 |
| 4,691,258 | * | 9/1987 | Kobayashi et al. ................ 360/77.02 |
| 4,825,316 | * | 4/1989 | Kishi et al. ........................ 360/97.02 |
| 5,055,969 | | 10/1991 | Putnam ................................. 361/398 |
| 5,140,482 | * | 8/1992 | Kimura et al. ........................ 360/104 |
| 5,297,130 | * | 3/1994 | Tagawa et al. ....................... 369/126 |
| 5,754,355 | * | 5/1998 | Nakamura et al. ................ 360/73.03 |

OTHER PUBLICATIONS

*Hutchinson Technology 1996 Annual Report,* pp. 16–17.

\* cited by examiner

*Primary Examiner*—Robert S. Tupper
*Assistant Examiner*—Julie Anne Watko
(74) *Attorney, Agent, or Firm*—Westman, Champlin & Kelly, P.A.

(57) ABSTRACT

A suspension assembly for supporting a slider carrying transducer elements. The suspension assembly including a load beam and a device for adaptively adjusting the flexure of the load beam to adjust preload force supplied to the slider.

15 Claims, 8 Drawing Sheets

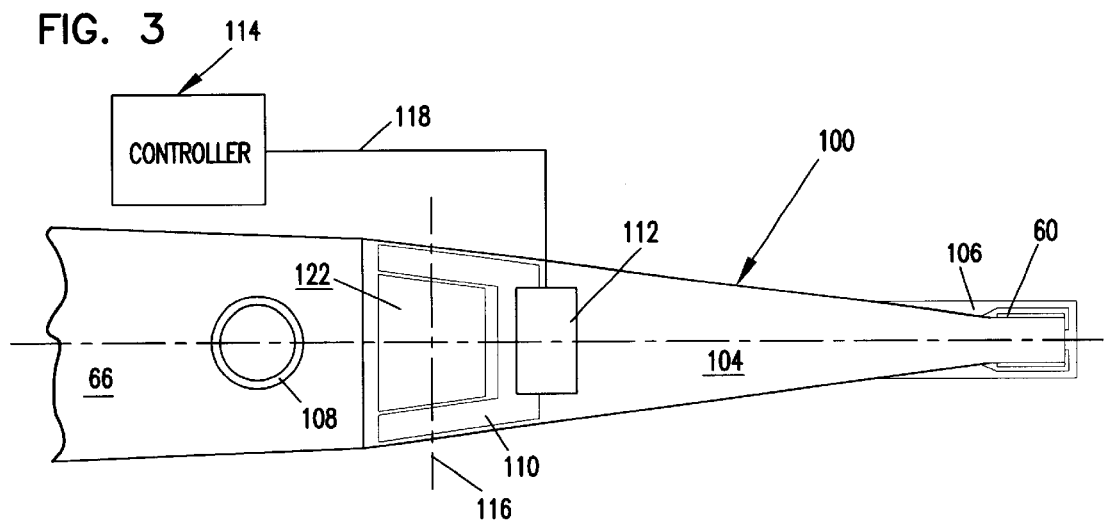
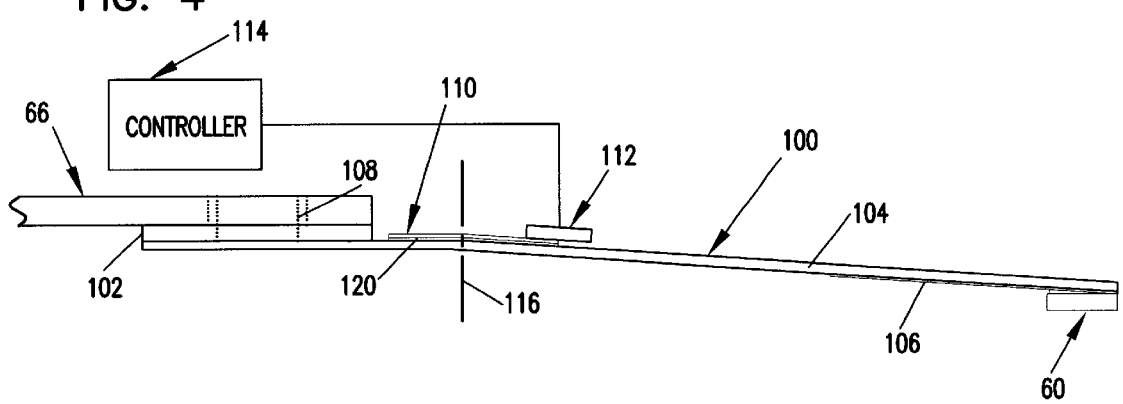

SUSPENSION WITH ADJUSTABLE PRELOAD

CROSS-REFERENCE TO RELATED APPLICATION

This application claims priority to Provisional Application Ser. No. 60/075,714 filed Feb. 24, 1998, and entitled "AN ADAPTIVE SUSPENSION PRELOAD USING HEAT DISSIPATED FROM A SUSPENSION MOUNTED PRE-AMPLIFIER".

FIELD OF THE INVENTION

The present invention relates to a data storage system. In particular, the present invention relates to an adaptive preload system for a suspension assembly for supporting data heads.

BACKGROUND OF THE INVENTION

Disc drives are well known in the industry. Such drives use rigid discs coated with a magnetizable medium for storage of digital information in a plurality of concentric data tracks. Typically, disc drives include a disc pack including a plurality of concentric discs mounted on a spindle motor which causes the discs to spin. Heads carrying transducer elements are supported via a suspension assembly relative to the disc surfaces to read and or write digital information to the disc surfaces. Known transducer elements include magnetoresistive ("MR") and inductive transducer elements.

Heads include a slider supported via the suspension assembly coupled to an actuator assembly Sliders include an air bearing surface which faces the disc surface. As the disc rotates, the disc drags air past the slider along the air bearing surface in a direction approximately parallel to the tangential velocity of the disc. As the air passes beneath the air bearing surface, the pressure between the disc and the air bearing surface increases, which creates a hydrodynamic lifting force that causes the slider to lift directly above the disc surface to read and/or write data to the surface of the disc. A fixed preload force is supplied to the slider via the suspension assembly to bias the head toward the disc surface. Prior to rotation of the disc, the slider rests on the disc surface. The slider is not lifted from the disc until the hydrodynamic lifting force, caused by rotation of the disc, is sufficient to overcome preload force holding the slider to the disc surface.

The hydrodynamic properties of the slider are affected by the speed of rotation of the disc, the design of the air bearing surface of the slider, and the preload force supplied to the slider via the suspension assembly. Areal disc drive density is increasing and thus, desired slider fly height is decreasing. The decrease in slider fly height requires better control of fly height variations to maximize recording performance without sacrificing mechanical reliability. With typical slider fly heights approaching 1 μinch and less, conventional methods of controlling fly height variations are approaching their capability limits. Hence it is desirable to find new methods of improvising dive performance, manufacturing yields and mechanical reliability for disc drives.

Increased preload tends to increase wear and damage to the head and degrade mechanical reliability since a greater force is supplied to the head during contact starts and stops (CCS) and operation. Increased preload also increases the stiction force which increases power required to rotate the spindle motor and discs.

It is desirable to provide a suspension system having desired fly-height attributes without degradation of mechanical reliability and performance. The present invention addresses these and other problems, and offers other advantages over the prior art.

SUMMARY OF THE INVENTION

The present invention provides an assembly for meeting the demands for higher areal densities without significant compromise to mechanical reliability and performance. The present invention is an adjustable preload suspension system and includes a load beam adapted to provide an adjustable preload force to a slider coupled to the load beam.

BRIEF DESCRIPTION OF THE DRAWINGS

FIG. 3 is a top plan view of an embodiment of a suspension system supporting a slider including an adjustable preload of the present invention.

FIG. 4 is a side view of the embodiment of the suspension system of FIG. 3.

DETAILED DESCRIPTION OF THE PREFERRED EMBODIMENTS

Figure 1:
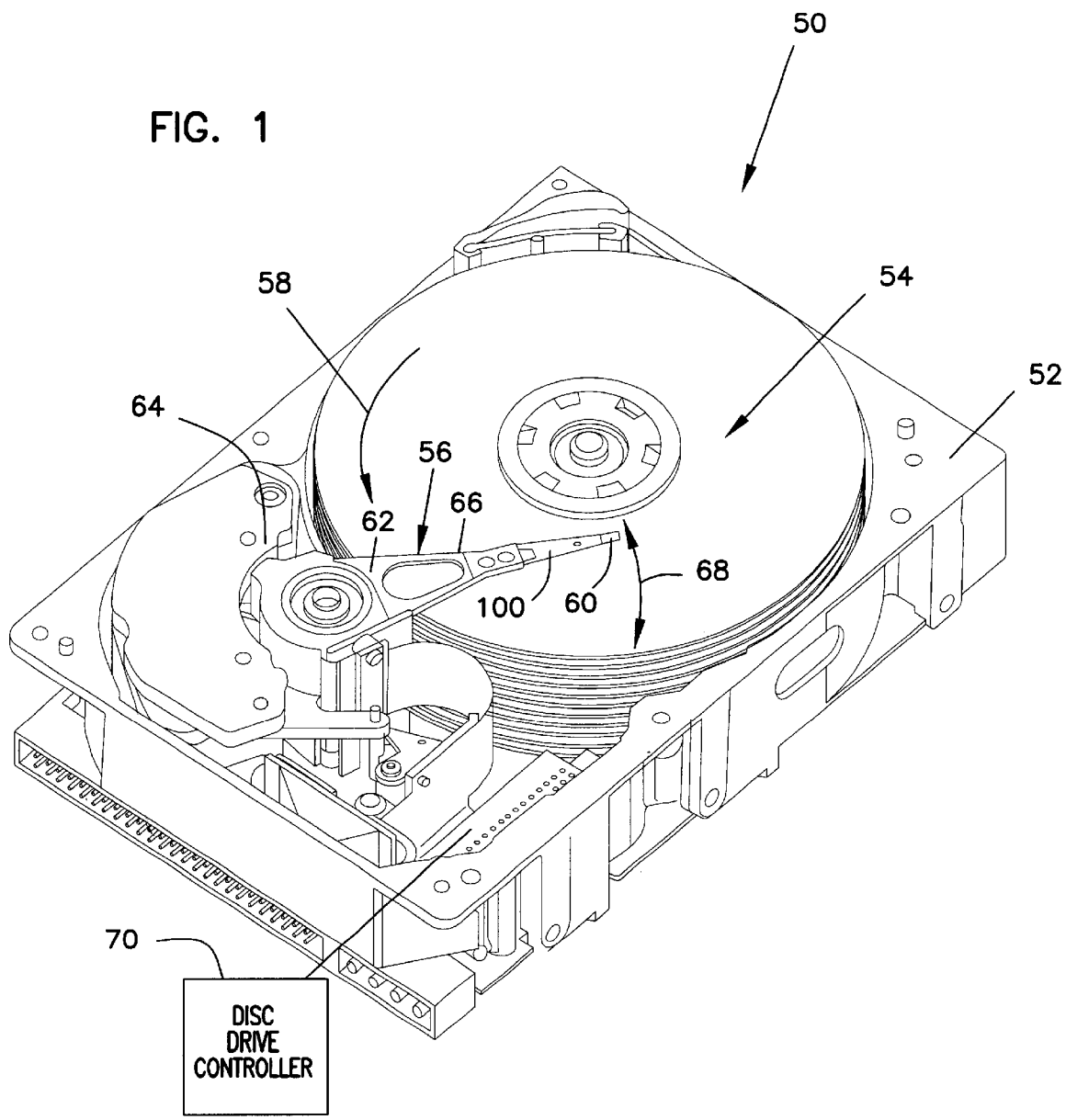
FIG. 1 is a perspective view of a disc drive.

FIG. 1. illustrates a disc drive 50 including a chassis 52, discs 54, and actuator assembly 56. Discs 54 are rotationally coupled to chassis 52 via a spindle motor (not shown) for rotation, as illustrated by arrow 58. Actuator assembly 56 rotationally supports sliders 60 for reading and/or writing data to and from discs 54. The actuator assembly includes E-block 62, voice coil motor (VCM) 64 and a suspension assembly 100. As shown, E-block 62 is rotationally coupled to chassis 52. The E-block 62 includes a plurality of actuator arms 66 and suspension assembly 100 (only one shown in FIG. 1) to support sliders 60 relative to the disc surface. The actuator block rotates as illustrated by arrow 68 to move sliders 60 (or heads) along an arcuate path for placement relative to data tracks of a disc 54 to read or write data relative to the disc surface. Movement of the E-block 62 is controlled by voice coil motor 64, which is coupled to drive circuitry of the disc drive illustrated by block 70. Operation of the spindle motor (not shown) is also coupled to drive circuitry.

Figure 2:
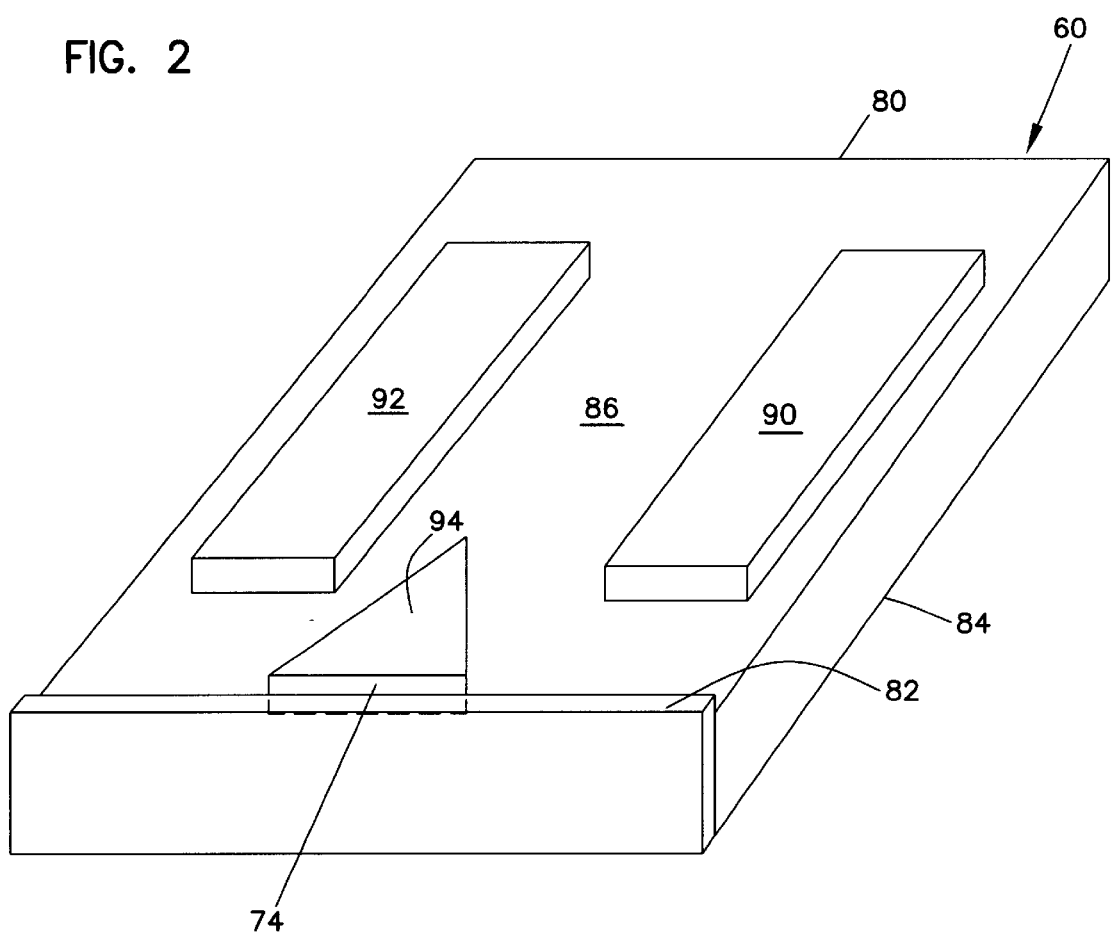
FIG. 2 is a perspective view of a slider supporting transducer elements.

As shown in FIG. 2, slider 60 supports transducer elements 74 (illustrated schematically) to define a head for read and write operations. Transducers may be inductive type transducers or magnetoresistive transducers. FIG. 2 illustrates one embodiment of a slider 60 formed of a rigid member including a leading edge 80, a trailing edge 82, an upper surface 84, and a lower air bearing surface 86. The lower air bearing surface 86 faces the disc surface and includes raised side rails 90 and 92, and a center rail 94. Center rail 94 supports transducers for read or write operations. Discs 54 are rotated ("spin-up") to create a hydrodynamic lifting force to lift the slider 60 above the disc surface for recording. Although a particular bearing surface is shown, it should be understood that alternate bearing designs may be used and application is not limited to a particular bearing design.

As shown in FIGS. 3–4, suspension assembly 100 is coupled to actuator arm 66 to flexibly support slider 60 relative to the disc surface. As shown, suspension assembly 100 includes a mounting plate 102, load beam 104 and a gimbal spring 106. As illustrated, mounting plate 102 includes a stake 108 for swaging the mounting plate 102 to actuator arms 66 in a known manner. The gimbal spring 106 supports slider 60 to pitch, roll and follow the topography of the disc in a known manner. Gimbal spring 106 is flexibly coupled to load beam 104. The upper surface 84 (FIG. 2) of slider 60 is coupled to gimbal spring 106. An end of the load beam 104 supplies a load force to the slider 60 to bias the slider toward the disc surface.

Prior to operation, the slider 60 is parked on the disc surface for contact starts and stops ("CSS"). Rotation of the discs 54 creates a fluid or air flow under the bearing surface to raise the slider 60 above the disc surface for recording. Stiction force holds the slider 60 to the disc surface and rotational force must be imparted to the disc 54 to overcome the stiction holding the slider 60 to the disc surface. The stiction between the slider and disc surface is a function of the load force supplied to the slider by the suspension assembly or load beam. Larger stiction force increases power required for "spin-up" to lift the slider above the disc surface. Larger preload force also tends to increase wear of the slider during contact starts and stops degrading mechanical reliability and performance.

The equilibrium of the hydrodynamic lifting force $F_b$ created by the bearing surface and the load force $F_1$ supplied by the load beam 104 at least partially defines the fly height of the slider. Disc drive areal density is increasing and accordingly lower fly-height is desired for optimum read-write clarity. To provide lower fly height, the preload force to the slider may be increased. However, as previously explained, increased preload increases stiction and wear and degrades mechanical reliability and performance. In prior suspension designs a fixed load force is applied to the slider and thus it was necessary to compromise between lower fly height and mechanical reliability and performance. The present invention provides a suspension assembly having an adjustable or adaptive preload.

In one embodiment shown in FIGS. 3–4, the adjustable preload suspension 100 includes a thermally expandable member 110, a heat source 112 (shown schematically) and a controller 114 for operating the heat source 112. Heat source 112 is coupled to expandable member 110. When heat is supplied to member 110, member expands for adjusting the preload. The expansion dimension of member 110 is provided as follows:

$$\Delta l = (\alpha * \Delta T) * l_1$$

where:

$l_1$=original length $\Delta l$=is the change in length $l_1$ due to $\Delta T$ $\alpha$=is the coefficient of thermal expansion for the member $\Delta T$=is the temperature change Thus, the expanded length dimension $l_2$ for member 110 is $l_2=l_1+\Delta l$. Typically, the load beam is formed of a stainless steel material and is stressed or bent about a flexure axis 116 to supply preload to the slider 60. The thermally expandable member 110 is coupled to the load beam 104 proximate to the flexure axis 116 to adjust the preload.

Figure 5:
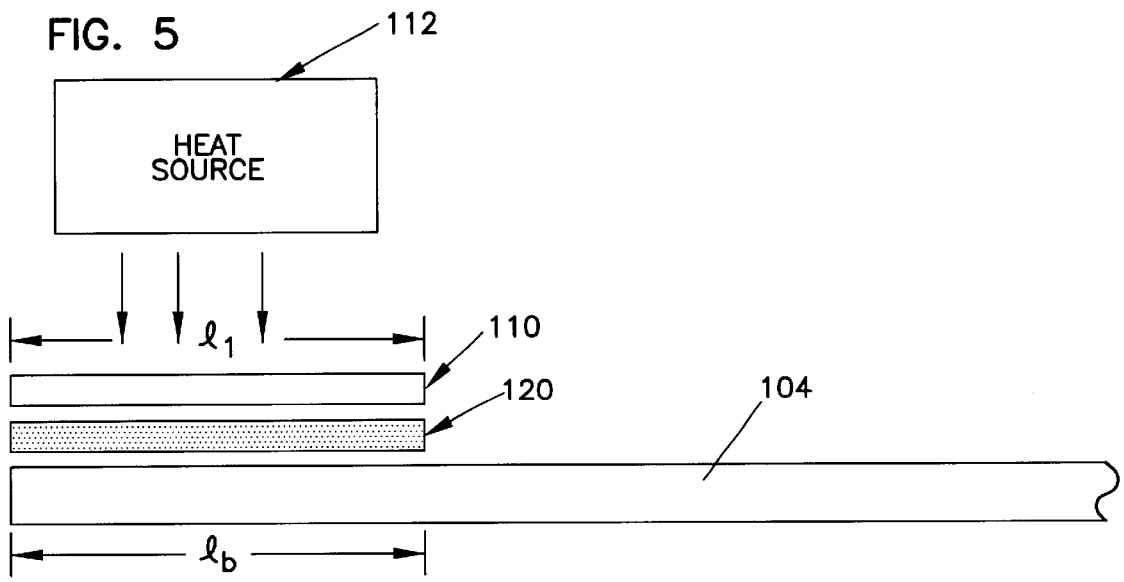
FIG. 5 is an illustrate view of a composite structure for the adjustable preload of the present invention.
Figure 6:
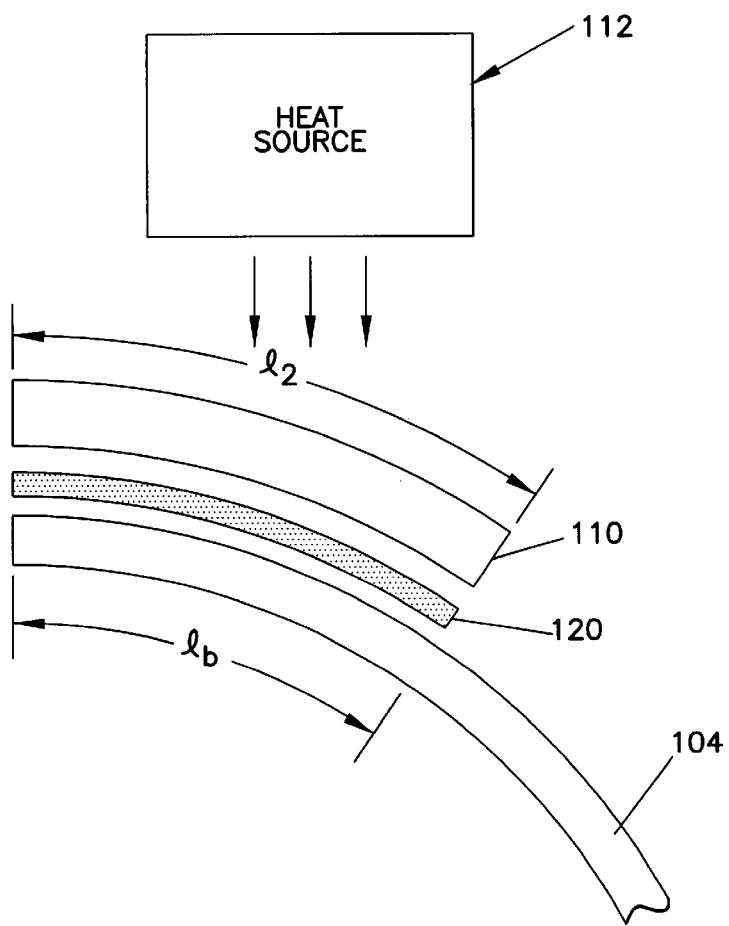
FIG. 6 illustrates operation of the composite structure of FIG. 5.

Heat source 112 is electrically coupled to controller 114 as illustrated by line 118 to adjustably control heat source 112. In the embodiment shown, insulating layer 120 isolates the load beam 104 from member 110 and heat source 112. As progressively illustrated in detail in FIGS. 5–6, heat is supplied to expand member 110 longitudinally. Since load beam 104 is insulated from heat, load beam 104 does not expand at the rate of expandable member 110. Thus, while the dimension of member 110 changes from $l_1$ to $l_2$, where $l_2>l_1$, the equivalent length of the load beam in the embodiment described remains generally constant $l_b$.

As shown, the different expansion rates causes load beam to bend about flexure axis 116 to adjust the preload to the slider. Thus, operation of the embodiment of the adjustable preload suspension requires a dimension differential between member 110 and load beam for flexure. In the embodiment shown, the dimension of the load beam $l_b$ remains relatively constant to provide the dimension differential for flexure.

Prior to operation and during spin-up, heat is not applied to member 110 to reduce the preload and thus stiction. During operation heat is applied to expand member 110 to increase preload for desired fly height. After operation is complete, preload is decreased for spin-down to limit wear and damage to the head for contact starts and stops. As described, the adjustable preload suspension assembly improves mechanical reliability and performance for spin-up and spin down.

In an example embodiment, the thermally expandable member 110 is formed of a material having a different coefficient of thermal expansion than the load beam to provide differential expansion for flexure of the load beam 104. In another example embodiment, load beam is formed of a stainless steel material, and the heat expandable member may be a flexible circuit having a polyimide base such as "Kapton", which is a trademark for a polyimide product manufactured by E. I. DuPont De Nemours Company of Wilmington, Del., and including copper paths or traces. Also as shown, the member 110 may be shaped to conform to the surface configuration of the load beam 104 at axis 116. In the embodiment shown, the member 110 is shaped to align with an opening 122 of the load beam.

Figure 7:
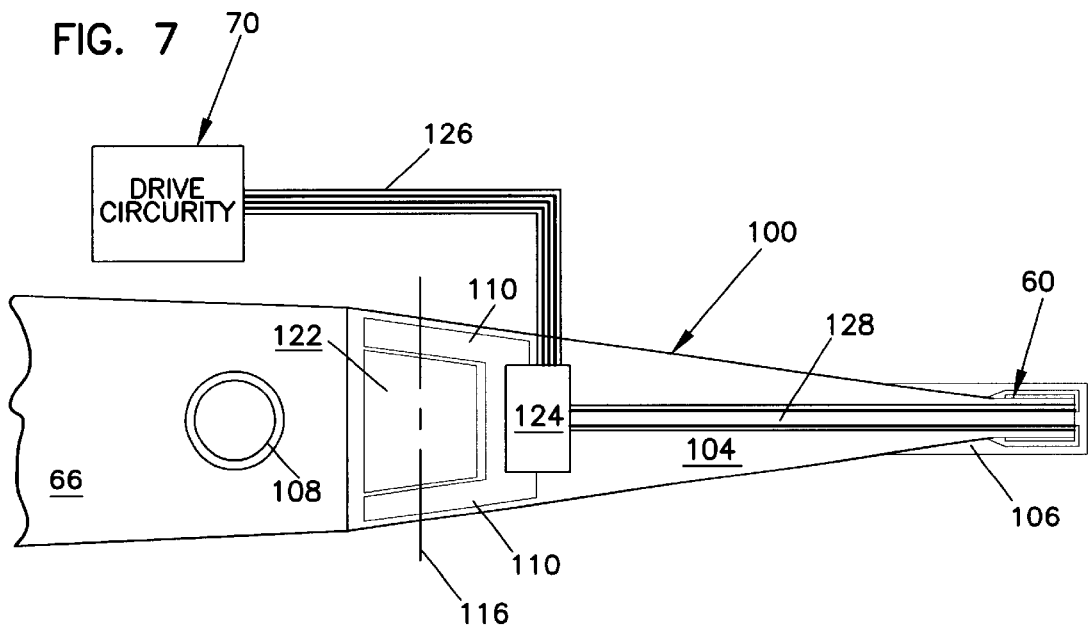
FIG. 7 is a top plan view of another embodiment of an adjustable preload suspension system.
Figure 8:
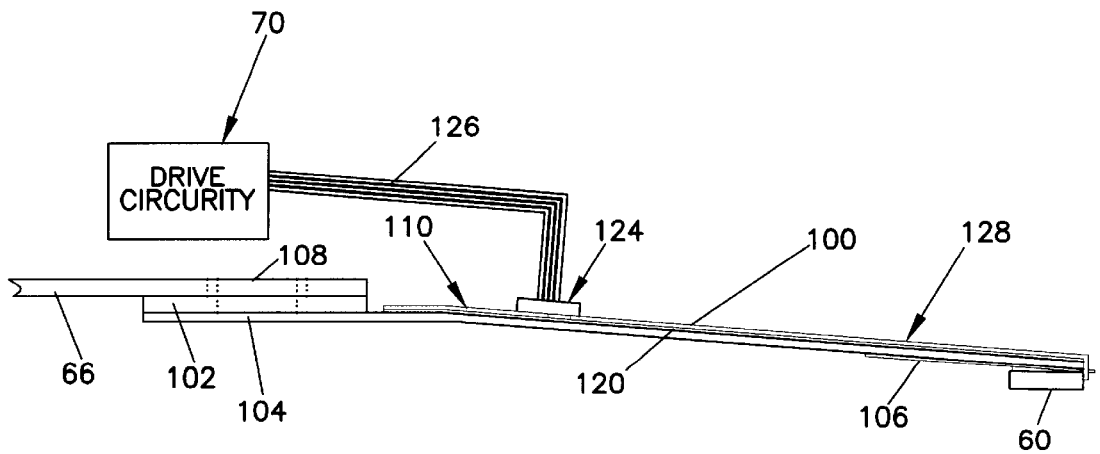
FIG. 8 is a side view of the embodiment of FIG. 7.

As previously explained, for operation, the heat source heats the expandable member 110 to adjust the preload. In a preferred embodiment of the invention illustrated in FIGS. 7–8, the heat source may integrated with the head circuitry. In particular, heat generated from a preamplifier 124 for amplifying data signals for the transducer elements (read and write transducer elements) may also be used for preload adjustments. In one embodiment, the preamplifier 124 is mounted on the load beam proximate to the expandable member 110 so that member 110 is thermally coupled to the preamplifier 124 and the preamplifier 124 is electrically connected to drive circuitry 70 as illustrated by connector 126. Transducer elements are electrically coupled to the preamplifier by leads 128. As shown schematically illustrated, leads are preferably formed of a printed "flex circuit". Insulating layer 120 electrically isolates printed "flex circuit" from load beam 104 so that the electrical signal is not degraded.

The preamplifier 124 dissipates heat proportional to its power used. Preamplifier 124 power is a function of its mode of operation and may be either a result of read or write activity, or controlled specifically for the purpose of load force control. Preamplifier 124 operation, and the resulting power used, is controlled by drive circuitry 70. Prior to and subsequent to discs spinning, power dissipated in the preamplifier 124 is low so that the load force is reduced while the slider is parked on the disc surface. The reduced load force reduces the stiction. The reduced stiction reduces the motor power required for start-up since less power is required to overcome the stiction force. Furthermore, reduced power in the preamplifier during "spin down" reduces the heat dissipated. The reduced heat reduces the load force to protect the slider from damage and wear during contact starts and stops to improve mechanical reliability.

Power in the preamplifier 124 may be reduced during periods when the transducer elements are not operational thus reducing the load force and drag, which thus reduces power requirements for operating the spindle motor to rotate the data storage medium. Furthermore, during reading and writing data from/to the spinning discs, preamplifier power may be controlled for controlling or adjusting the preload force. In a preferred embodiment, preload may be adjusted to improve error rate performance.

Figure 9:
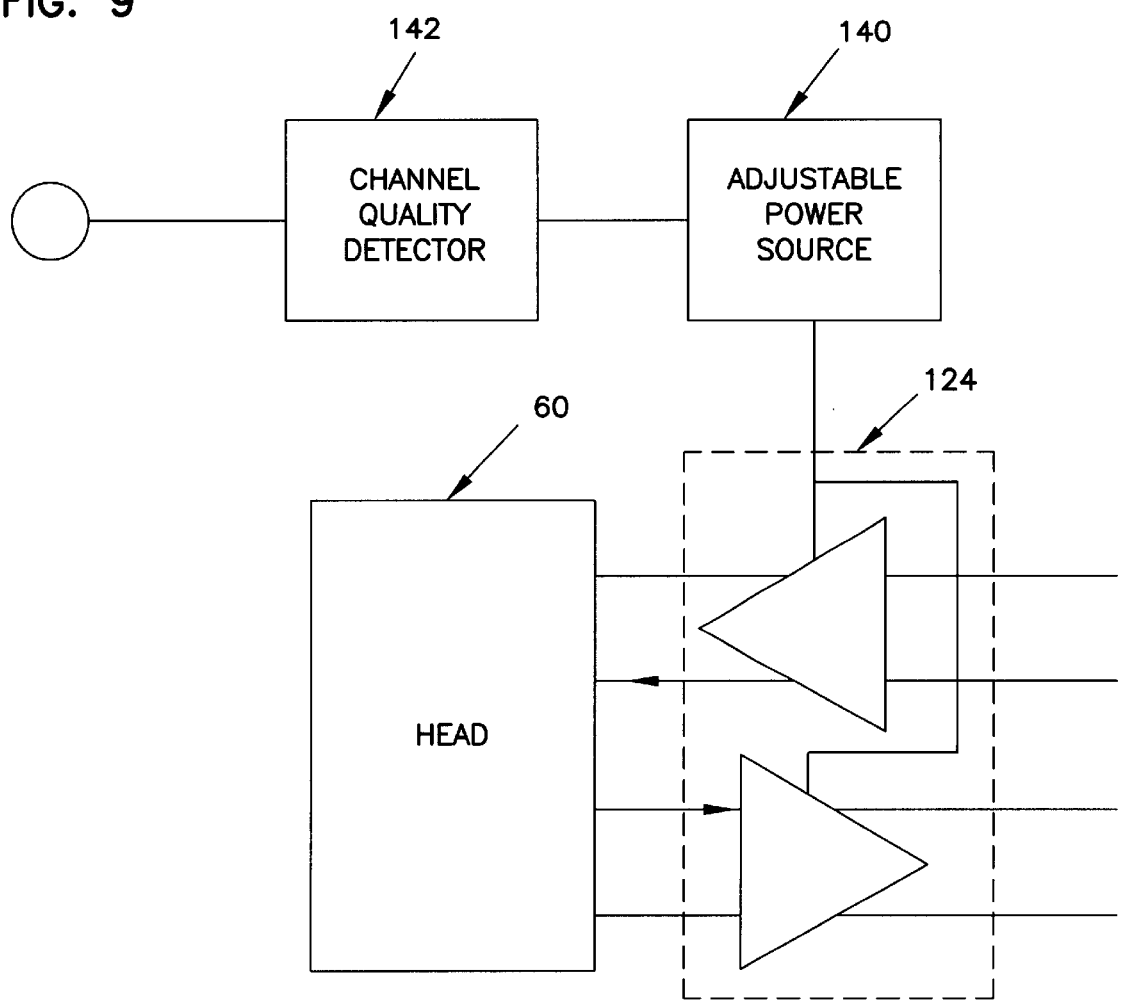
FIG. 9 is a block diagram of one circuit embodiment for adjusting preload.

Operating characteristics of a head vary based upon operating and manufacturing tolerance variations. In a fixed preload suspension, there may be variations in fly height characteristics due to manufacturing and operating tolerance variations. As illustrated schematically in FIG. 9, the preamplifier 124 or other power dissipating device is coupled to an adjustable power source 140 to adjust preload. The adjustable power source 140 is adjusted based upon output from a channel quality detector 142 to compensate for poor error rate performance. In one embodiment, power may be adjusted based upon error rate prediction. Thus, for a high error rate performance, increased power is supplied to increase preload to reduce fly height to improve error rate performance. In one embodiment power may be increased to increase preload to burnish asperities.

Figure 10:
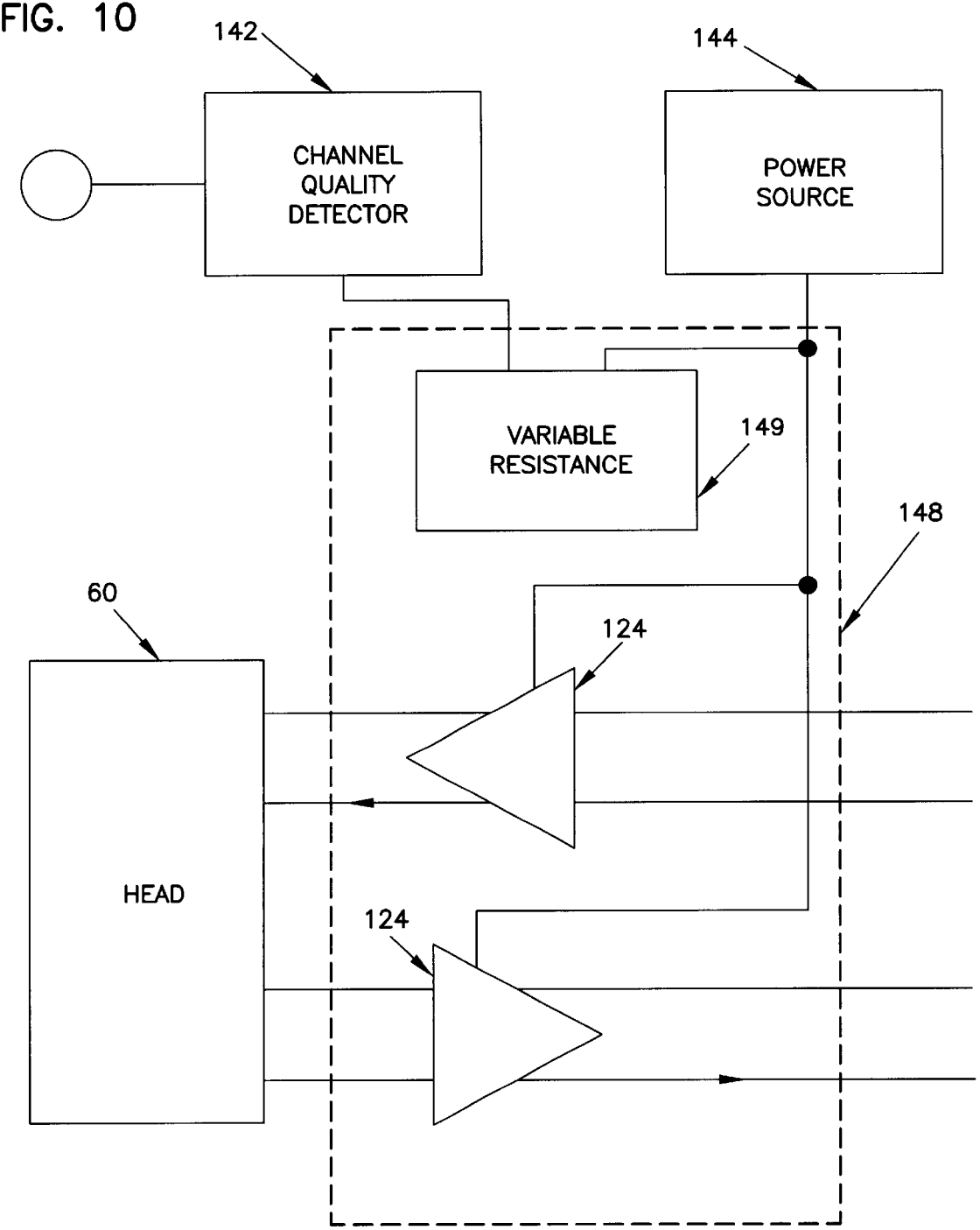
FIG. 10 is a block diagram of an alternate circuit embodiment for adjusting preload.

Power may be adjusted by adjusting the power duty cycle to increase the average power delivered to the preamplifier 124. Alternatively a commercial preamplifier including programmable power dissipation may be used. In an alternative embodiment illustrated schematically in FIG. 10, the circuitry includes a constant power source 144 and the preamplifier circuit 148 has variable resistance 149 as illustrated schematically for adjusting the heat dissipated by the preamplifier 124 based upon data from the channel quality detector 142.

Figure 11:
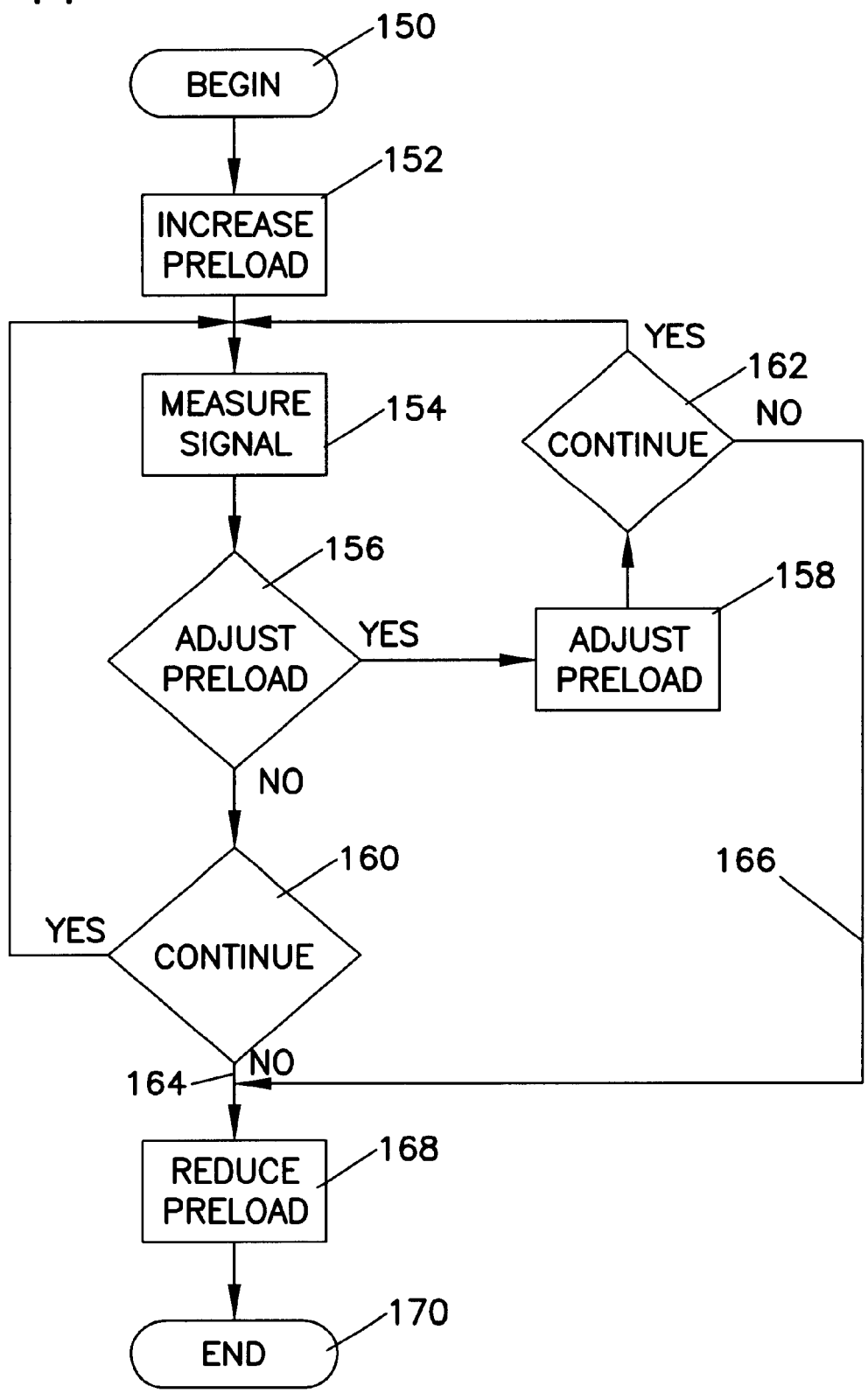
FIG. 11 is a flow chart illustrating operation of an embodiment of the adjustable preload suspension.

FIG. 11 is a flow chart illustrating operation of a preferred embodiment of the present invention. As shown operation begins as illustrated by block 150. As previously explained, rotation of discs creates a hydrodynamic lifting force to raise the slider 60 above the disc surface for operation. Prior to "spin-up", the preload force to the slider 60 is reduced. Accordingly for operation, the adjustable suspension increases the preload as illustrated by block 152 after spin-up. Preferably during operation, a channel quality detector 142 measures error performance for transducer elements as illustrated by block 154. Based upon measurement from the channel quality detector 142, the system determines whether to adjust preload as illustrated by block 156. If error performance is high, then preload is adjusted as illustrated by block 158. Operation continues as illustrated by blocks 160, 162 and the system constantly monitors channel quality for optimum operating control. If operation is complete as illustrated by lines 164, 166, preload is reduced as illustrated by block 168 for "spin-down". Thereafter operation ends as illustrated by block 170.

Thus the present invention provides a suspension assembly 100 including a load beam 104 and a means for adaptively adjusting the flexure of the load beam about flexure axis 116 to adjust preload force supplied to the slider 60. In the embodiments shown, the means for adaptively adjusting the flexure includes a thermally expandable member 110 coupled to the load beam 104 and a heat source 112. Heat is supplied to expand member 110 to flex load beam 104 to increase preload. Although, a particular adjustable preload suspension is shown, it should be understood that the invention is not limited to the exact embodiments shown.

Though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a magnetic data storage system, it will be appreciated by those skilled in the art that the teachings of the present invention can be applied to other systems, like an optical storage system, without departing from the scope and spirit of the present invention.

What is claimed is:

1. A combination comprising:
   a head including at least one transducer element;
   a flexible load beam operably coupled to the head to supply a load force to the head;
   an amplifier supported on the flexible load beam;
   leads connecting the at least one transducer element on the head to the amplifier; and
   a thermally expandable member coupled to the load beam to flex the load beam by expansion of the thermally expandable member and the expandable member coupled to the amplifier and expandable by heat dissipated from the amplifier to flex the load beam to adjust the load force supplied to the head.

2. The combination of claim 1 wherein the load beam and the thermally expandable member have different coefficients of thermal expansion.

3. The combination of claim 1 wherein the load beam is thermally insulated from the thermally expandable member.

4. The combination of claim 1 and comprising:
   an adjustable power source coupled to the amplifier; and
   a channel quality detector operably coupled to the adjustable power source to adjust power to the amplifier to adjust the load force based upon error rate or error rate prediction.

5. A combination comprising:
   an elongated flexible load beam;
   a head supporting at least one transducer element coupled to the flexible load beam so that the load beam supplies a load force to the head;
   an amplifier supported on the load beam and coupled to the at least one transducer element; and flexure adjusting means operably coupled to the amplifier and the load beam for selectively adjusting flexure of the load beam to adjust the load force to the head.

6. The combination of claim 5 wherein the flexure adjusting means includes:

a composite structure operably coupled to the amplifier and the load beam comprising first and second layers, a length dimension of the first layer being thermally expandable and the second layer being operably coupled to the first layer so that expansion of the first layer flexes the second layer to adjust the load force of the load beam.

7. The combination of claim 6 wherein the second layer is the load beam.

8. The combination of claim 6 wherein the second layer is thermally insulated from the thermally expandable first layer.

9. The combination of claim 6 wherein the first and second layers have different coefficients of thermal expansion.

10. The combination of claim 5 wherein the flexure adjusting means increases the load force to the head after spin-up of discs and decreases the load force to the head prior to spin down of the discs.

11. The combination of claim 5 and the combination further comprising:

a channel quality detector coupled to the flexure adjusting means to adjust the load force based upon error detection from the channel quality detector.

12. A method for operating a data storage medium comprising steps of:

a. providing a slider to support a transducer element;

b. providing a flexible load beam to support the slider relative to the data storage medium, the load beam adapted to provide a preload force to the slider; and c. supplying a signal to an amplifier coupled to the transducer element and supported on the load beam to adjust flexure of the load beam to adjust the preload force to the slider.

13. The method of claim 12 and further comprising the steps of:

d. measuring data quality for data recovered from the data storage medium; and e. supplying a signal to the amplifier to adjust the preload force based upon the measured data quality.

14. The method of claim 12 and further comprising the step of:

d. supplying a signal to the amplifier to increase the preload force after spin up and to reduce the preload force for spin down.

15. The method of claim 12 and further comprising the steps of:

d. providing a thermally expandable member operably coupled to the load beam and the amplifier, e. providing a signal to the amplifier to heat the expandable member to adjust the flexure of the load beam to adjust the preload force.

* * * * *